United States Patent [19]

Dufft

[11] 4,296,998

[45] Oct. 27, 1981

[54] ENCAPSULATED LIGHT SOURCE WITH COUPLED FIBERGUIDE

[75] Inventor: William H. Dufft, Shillington, Pa.

[73] Assignee: Bell Telephone Laboratories, Incorporated, Murray Hill, N.J.

[21] Appl. No.: 104,364

[22] Filed: Dec. 17, 1979

[51] Int. Cl.³ .............................................. G02B 7/26
[52] U.S. Cl. ........................... 350/96.20; 250/552; 350/96.17; 350/320; 357/17; 357/74
[58] Field of Search ............... 350/96.15, 96.17, 96.20, 350/96.21, 320; 250/227, 552; 357/17, 18, 30, 72, 74, 80, 81

[56] References Cited

U.S. PATENT DOCUMENTS

| 3,423,594 | 1/1969 | Galopin | 350/96.20 X |
|---|---|---|---|
| 3,774,987 | 11/1973 | Boivin | 350/96.18 |
| 3,968,564 | 7/1976 | Springthorpe | 350/96.15 X |
| 4,033,668 | 7/1977 | Presby | 350/96.21 |
| 4,065,203 | 12/1977 | Goell et al. | 350/96.20 |
| 4,101,197 | 7/1978 | Kent et al. | 350/96.17 |
| 4,118,105 | 10/1978 | Voigt | 350/96.20 |
| 4,119,363 | 10/1978 | Camlibel et al. | 350/96.20 |
| 4,144,541 | 3/1979 | Schaefer et al. | 357/30 |
| 4,167,744 | 9/1979 | Nyul | 357/17 |
| 4,170,399 | 10/1979 | Hansen et al. | 350/96.20 |
| 4,186,994 | 2/1980 | Denkin et al. | 350/96.17 |
| 4,186,996 | 2/1980 | Bowen et al. | 350/96.20 |
| 4,192,574 | 3/1980 | Henry et al. | 350/96.17 |
| 4,199,222 | 4/1980 | Ikushima et al. | 350/96.20 X |
| 4,204,743 | 5/1980 | Etaix | 350/96.20 |

FOREIGN PATENT DOCUMENTS

| 2755372 | 6/1978 | Fed. Rep. of Germany | 350/96.20 |
|---|---|---|---|
| 2721991 | 11/1978 | Fed. Rep. of Germany | 350/96.20 |
| 2724850 | 12/1978 | Fed. Rep. of Germany | 350/96.15 |
| 2842743 | 4/1979 | Fed. Rep. of Germany | 350/96.20 |
| 2907401 | 9/1979 | Fed. Rep. of Germany | 350/96.20 |
| 2313688 | 12/1976 | France | 350/96.20 |

OTHER PUBLICATIONS

Bailey et al., "Method and Apparatus to Align and Affix...", *Xerox Discl. Journal*, vol. 4, No. 3, May/Jun. 1979, pp. 387-388.

*Primary Examiner*—John D. Lee
*Attorney, Agent, or Firm*—H. W. Lockhart

[57] ABSTRACT

A laser is coupled to an optical fiber in an hermetic encapsulation by locking a portion of the fiber near the laser in a body of solder. With the laser energized, the position of the optical fiber is adjusted within an aperture through the solder body to optimize the light output at the end of the fiber. The solder body then is heated to cause flow around the fiber and cooled to lock the fiber in position.

4 Claims, 2 Drawing Figures

ENCAPSULATED LIGHT SOURCE WITH COUPLED FIBERGUIDE

BACKGROUND OF THE INVENTION

This invention relates to optical communications and more particularly to an encapsulated light source in which a fiberguide is coupled to a semiconductor light emitting device such as a junction laser.

In laser encapsulations containing a coupled fiberguide, it is important to secure the fiberguide in alignment with the laser chip so that minimal change in coupling can occur in use, and optimum light output to the transmission system is assured.

One practice used heretofore to couple an optical fiber to the output of a laser is to mount the end portion of the fiberguide in a precisely machined groove aligned with the laser. An arrangement of this type is disclosed in U.S. Pat. No. 3,774,987. Another technique, shown in U.S. Pat. No. 4,065,203, is to use a two-piece fiberguide coupling and to fix the innermost fiberguide portion in position with respect to the laser chip by the use of an epoxy cement.

The foregoing arrangements of the prior art have obvious shortcomings from the standpoint of ease and economy of manufacture, uniformity, stability, and reliability. The scheme in which the fiberguide is mounted in a groove, while suitable for the laboratory, is not a manufacturable structure which retains stability in field use in an optical communications system. The two-coupler arrangement also lacks the necessary assurance of accurate alignment and further does not provide long-term stability and reliability inasmuch as the organic materials used for affixing the fiberguide are very susceptible to creep, that is a change in dimension with time, even at room temperatures. Moreover, the high vapor pressure of such organic adhesives when used in an hermetic encapsulation result in the formation of unacceptable deposits on critical surfaces of the laser.

Accordingly, an object of this invention is a structure and a method for quickly and economically locking the end portion of a fiberguide to the light output of a laser in an hermetic encapsulation.

It is a further object of the invention to provide a fiberguide locking arrangement which has long-term stability and can be used without deleterious effect in an hermetic encapsulation.

SUMMARY OF THE INVENTION

In accordance with an embodiment of the invention, a semiconductor junction laser chip is mounted centrally in an hermetic encapsulation. A fiberguide is hermetically sealed into the encapsulation with an end in close proximity to the light output face of the laser chip. The portion of the fiberguide near the laser chip is fixed in position with respect to the laser chip by being embedded in a body of solder or other suitable low melting metal. The solder mass has little or no creep in the normal temperature operating range, and its vapor pressure is sufficiently low so that no deleterious vapors are generated within the encapsulation.

The encapsulated light source in accordance with this invention is assembled facilely by manipulating the fiberguide portion within the unsealed encapsulation with the laser energized so that the light output at the exterior end of the fiberguide can be observed. The fiberguide portion within the encapsulation is manipulated within an oversize aperture in the solder body. When the optimum position has been determined, the solder is melted so that it flows around the fiberguide and upon cooling, solidifies and locks the fiberguide in position. The encapsulation then is completely sealed and evacuated or back-filled with a suitable atmosphere, for example, nitrogen.

BRIEF DESCRIPTION OF THE DRAWING

The invention and its other objects and features will be more clearly understood from the following description taken in conjunction with the drawing in which.

DETAILED DESCRIPTION

Figures 1, 2:
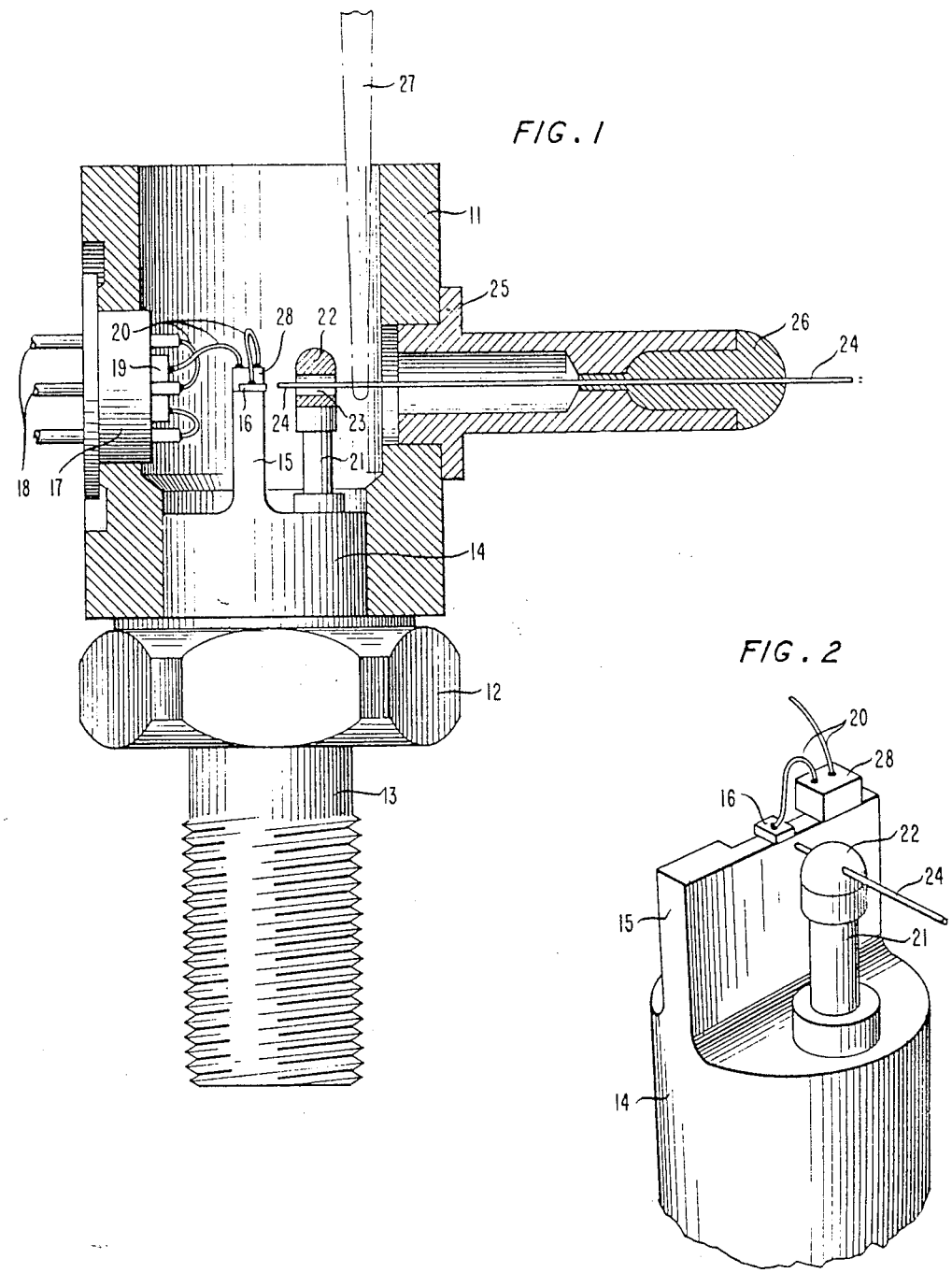
FIG. 1 is a side view in cross section of an encapsulated light source partially assembled in accordance with one embodiment of this invention.
FIG. 2 is a perspective view of a portion of the assembly of FIG. 1 showing the laser chip and locked fiberguide in greater detail.

FIG. 1 discloses a partially assembled encapsulated light source comprising a mounting stud 14 having a hex nut portion 12 and a threaded stud portion 13 for mounting the encapsulation. The stud portion 14 is enclosed by a housing 11 and has a pedestal portion 15 upon which a semiconductor junction laser 16 is mounted. As is known, the laser 16 emits light from opposed front and back faces substantially equally. An output fiberguide 24 is shown aligned with the one output face of the chip 16 and a monitoring photodiode 19 is positioned opposite the other output face of the laser 16. The photodiode 19 is mounted in a standard metal header 17 having leads 18. Interconnecting wire leads 20 within the housing provide the necessary interconnections to power the laser as well as to enable the photodiode 19 to function as a detector and monitor of the light output of the laser 16. An additional mounting block 28 is provided on top of pedestal portion 15 for convenience in making interconnections with the laser chip 16.

The fiberguide 24 is secured in a sleeve member 25 within which it is hermetically sealed by means of a solder mass 26. The member 25 is welded into the wall of housing 11. A pedestal member 21 is mounted on the stud portion 14 and has at the top of a solder body 22. An aperture 23 is provided in the solder body 22 through which the fiberguide 24 is inserted in alignment with the laser 16. The aperture 23 is sufficiently large to permit movement of the smaller fiberguide therein.

The fiberguide is shown in its locked condition in FIG. 2 in which elements are identified by the same reference numerals as those used in FIG. 1. The fiberguide 24 is shown embedded in the solder body 22 in alignment with the laser 16. The solidly fixed relationship of the respective parts of the assembly is clearly apparent. The encapsulation of FIG. 1 is completed by evacuating, back-filling with nitrogen, and sealing a cap member to the top of the housing 11.

Assembly of the encapsulated light source in accordance with this invention includes the mounting of the header 17 for the photodiode 19 in one wall of the housing 11 and the sleeve member 25 in the other wall. The solder seal 26 and the solder body 22 both have oversize apertures therethrough to enable feeding of the fiberguide 24 through the member 25 and the solder body 22. In a specific embodiment, the fiberguide has a diameter of 4 mils, and the aperture 23 through the solder body 22 has a diameter of 16 mils. The solder seal 26 in the sleeve member 25 has a bore diameter of 20 mils. When the fiberguide has been inserted with its end in proximity to the laser 16, the solder seal 26 is heated to a sufficiently molten condition so that upon solidification the fiberguide is hermetically sealed and fixed in its relation to the encapsulation in the horizontal or Z direction.

To facilitate the adherence of solder to the particular portions of the fiberguide, it has been found advantageous to coat those portions of the fiberguide with a metal film, and in particular a thin film of titanium, platinum, and gold applied in succession has been found useful. For fiberguides of certain diameters, it is also useful to round the end of the guide 24, typically by heating, to provide a lens effect and thus enhance the light coupling characteristics of the guide.

The critical aspect of the assembly with respect to the alignment of the fiberguide to the light output of the laser 16 is accomplished by manipulating the portion of the fiberguide 24 within the encapsulation by suitable means such as a tool 27 shown in broken outline which is controlled advantageously by means of a micromanipulator capable of both X and Y motion. During this manipulation, the laser is energized and a photodetector is positioned at the end of the fiberguide exterior to the housing beyond the seal 26. When the fiberguide is in a position which indicates optimum light output, the solder body 22 is heated sufficiently to cause flow of the solder into contact with the fiberguide 24. Then as heating is stopped, the body 22 solidifies and locks the now embedded fiberguide in position with respect to the laser. The solder body may be heated by means of a suitable tool or advantageously, by means of a gas laser. The use of a laser to heat the solder body has the advantage of reducing the general heating of the surrounding structure and therefore avoiding the need to allow for expansion and contraction during and after the assembly process.

Both the solder seal 26 and the solder body 22 use, in one specific embodiment, a tin-lead alloy in the proportion of 60 percent tin and 40 percent lead. This alloy has a melting temperature of 185 degrees C. and is advantageous in that it has substantially no long-term creep at standard operating temperatures. The other materials of the housing are not critical but are of the usual high quality metals. In particular, the stud member 14 is of oxygen-free, high-conductivity copper. The housing 11 and sleeve member 25 are a weldable steel, and the pedestal member 21 is a stainless steel.

Although the invention has been described in terms of a light source comprising a semiconductor junction laser, it will be understood that the invention is also applicable to arrangements using other semiconductor devices constituting focused light sources in which a high degree of coupling with respect to an optical fiberguide is desirable.

By the term "light", as used herein, is meant electromagnetic radiation in the invisible regions as well as in the visible region.

I claim:

1. An encapsulated light source comprising a housing having walls, light generating means in the housing comprising a semiconductor light emitting device having a light output face, light transmitting means comprising a fiberguide penetrating a wall of the housing for transmitting light from the light emitting device to the exterior of the housing, a pedestal member within the housing having a top surface adjoining the light output face of the light emitting device, an unhoused body of low melting metal mounted on the top surface of the pedestal, the metal body having a portion of the fiberguide embedded therethrough to lock the fiberguide in position relative to the light output from the light emitting device.

2. The method of fabricating an encapsulated light source including a coupled optical fiberguide which is locked in position relative to the source light output, the method comprising the steps of,
  (a) mounting a low-melting metal body in the encapsulation in close proximity to the light source, the body having an aperture therethrough several times larger than the diameter of the fiberguide,
  (b) inserting a portion of the fiberguide through the aperture,
  (c) energizing the light source to provide a light output,
  (d) manipulating the fiberguide within the aperture in the X and Y direction while observing the light output from the fiberguide to determine the optimum position of the fiberguide relative to the light source,
  (e) heating the body to a state sufficiently molten so that it flows into contact with the fiberguide portion and
  (f) cooling the body to the solid state to fix the fiberguide in position relative to the light source.

3. The method in accordance with claim 2 in which the light source is a semiconductor junction laser.

4. The method in accordance with claim 2 in which a laser is used to heat the low-melting metal body.

* * * * *